July 25, 1933.  A. L. EMENS  1,919,213
ELECTRICITY METER
Original Filed April 21, 1930   2 Sheets-Sheet 1
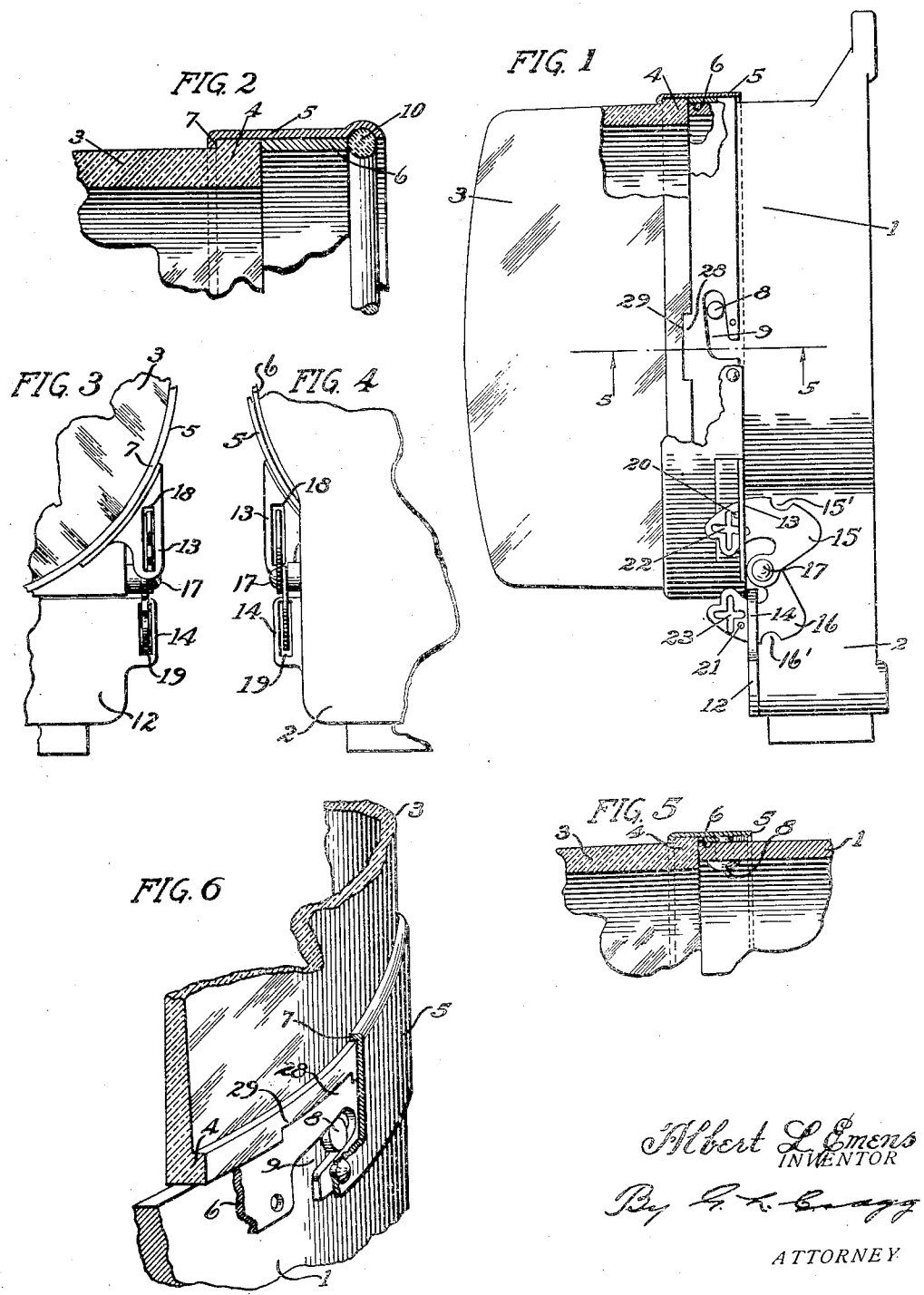

July 25, 1933.  A. L. EMENS  1,919,213
ELECTRICITY METER
Original Filed April 21, 1930   2 Sheets-Sheet 2
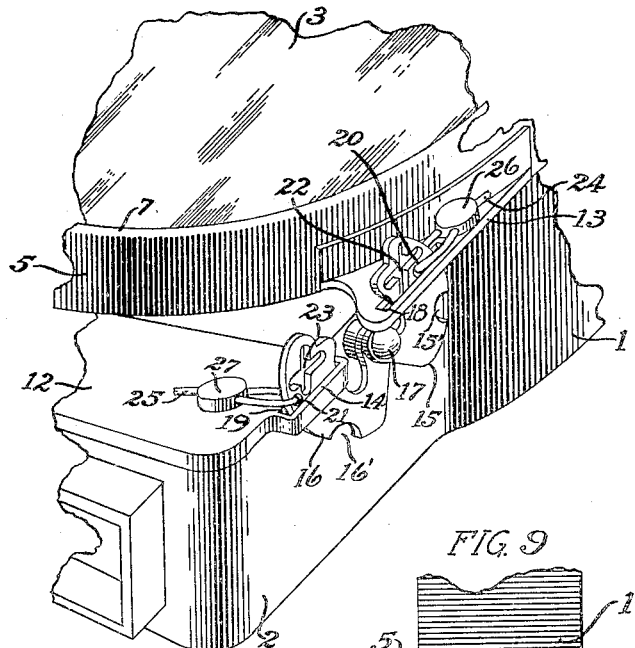
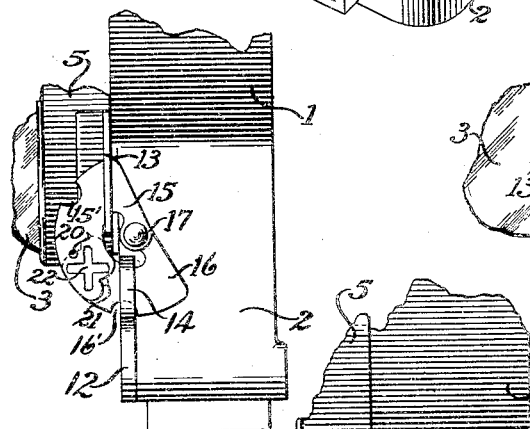
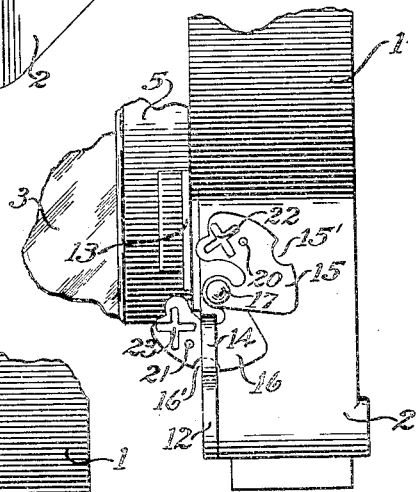
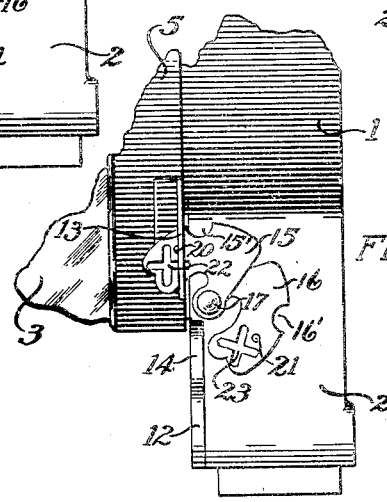
Albert L. Emens
INVENTOR
ATTORNEY Patented July 25, 1933

1,919,213

UNITED STATES PATENT OFFICE

ALBERT L. EMENS, OF LA FAYETTE, INDIANA, ASSIGNOR TO DUNCAN ELECTRIC MANUFACTURING COMPANY, OF LA FAYETTE, INDIANA, A CORPORATION OF ILLINOIS

ELECTRICITY METER

Application filed April 21, 1930, Serial No. 446,036. Renewed April 30, 1932.

My invention relates to electricity meters and has for its object the provision of an improvement in the union between the meter bases and meter covers and also an improvement in the construction of the locking or sealing devices employed in the meters. My invention, in one of its aspects, relates particularly to meters employing cup shaped and glass covers whose rims engage the meter bases. I laterally extend the rim of such a cover to form a flange and provide a metal band surrounding the cover flange and continguous portion of the meter base. This band has a groove into which the flange projects and in which the flange is snugly received. Separable interengaging formations, preferably bayonet projections and bayonet channels, are provided upon the base and band whereby the cover is held upon the base. I thus provide an improved union between the cover and metal base of the meter which enables the cover to be firmly clamped in position without danger of fracture.

My invention in another of its aspects relates to both the motor meter chamber and terminal chamber of the meter, each of these chambers having a cover which is provided with the improved locking or sealing device of my invention. These covers are provided with wings that preferably extend along the meter axis which is vertical. That is, these wings are in upright planes. They are in the region of and project beyond one side of the terminal chamber. The locking or sealing member is preferably pivoted upon the meter base at said side of the terminal chamber, one end of one part of this locking member being projectible through the aperture in one of said wings, and the remaining part of the locking member being projectible through the aperture in the other wing. The two parts of the aforesaid locking member that are individually receivable within the apertures of the wings are desirably separately formed and independently movable to enable either cover readily to be removed or displaced without interfering with the assembly of the other cover. In the preferred embodiment of the invention the wings are formed with holes through which sealing wire may be passed. This construction enables the employment of two sealing wires one individual to each of the aforesaid covers or one sealing wire common to such covers.

The invention will be more fully explained in connection with the accompanying drawings in which Fig. 1 is a side elevation illustrating the preferred embodiment of the invention, parts being broken away; Fig. 2 is a detail sectional view illustrating the preferred formation of the metal band by which the cover is assembled with the meter base; Fig. 3 is a front elevation of a portion of the meter in the region of the cover sealing or locking means; Fig. 4 is a rear view of the parts shown in Fig. 3; Fig. 5 is a detail sectional view of part of the structure as it appears in Fig. 1; Fig. 6 is a perspective view illustrating a fragment of the cover, a fragment of the meter base, a fragment of the metal band surrounding the cover and the bayonet projection and channel formations by which the cover and base are assembled; Fig. 7 is a perspective view of the structure shown in Fig. 1 with two sealing wires added, each cover having a sealing wire individual thereto; Fig. 8 is a side view illustrating the locking member adjusted to enable the use of one sealing wire common to both covers; Fig. 9 is a view illustrating one of the covers in this instance, the meter chamber cover, released by the locking device while the other cover is still held by its locking device; and Fig. 10 is a view similar to Fig. 9 excepting that the locking device is adjusted to release the terminal chamber cover while still holding the meter chamber cover.

The meter base is formed to constitute a chamber 1 that contains the operating meter mechanism and a chamber 2 that contains the terminals by which the meter is connected between the line and load circuits. The cover of the meter 3 is preferably cup shaped and formed of glass. This cover has its rim or base laterally extended to constitute a flange 4. I surround the rim or base end of the meter chamber cover 4 with a metal band which is preferably formed in built up sections, one of these sections being the outer ring 5 and the other being the inner ring 6. These rings are riveted together, the inner ring lapping the outer flat face of the cup rim and the outer ring having an inwardly projecting rim 7. The inner ring and this rim together define a groove into which the flange of the cover projects and in which the flange is snugly received. The separable inter-engaging formations by which the cover 3 and the meter base may be assembled are desirably in the form of diametrically opposite bayonet projections 8 extending from the meter base and diametrically opposite bayonet channels 9 provided within the inner ring 6. These channels slope so as to have cam engagement with the bayonet projections to bring the flat face of the cover rim snugly against the meter base, this construction being especially desirable where the meter cover is circular and the portion of the meter base engaged thereby is correspondingly circular or cylindrical. The outer ring 5 covers said bayonet channels and guards the same from access of weather, whose access is preferably further guarded against by means of a sealing gasket 10 which may be seated within a groove formed in the outer ring 5. This gasket is lapped by the inner ring 6 and projects sufficiently inwardly so as to have tight sealing engagement with the circular portion of the meter base surrounded thereby.

The meter cover 3 which is thus rotatively assembled with and disassembled from the meter base, is provided with locking or sealing means, whereby it may be held in its assembly. The meter base is provided with the extension 2 which constitutes a terminal chamber. This terminal chamber has a cover 12 which may be hinged at one corner, not shown. The terminal chamber cover is also provided with locking or sealing means for securing it in closed position. The two covers 3 and 12 are respectively provided with upright wings 13 and 14. These wings are in the region of and project beyond one side of the terminal chamber. I provide a locking member which is inclusive of two parts 15 and 16 that are preferably separately formed and are desirably provided with a common pivotal connection 17 with the meter base and finger tip receiving notches 15′, 16′. The pivotal axis of the locking member 15, 16 is desirably parallel with the wings 13 and 14 which are respectively formed with apertures 18 and 19 for receiving the ends of the parts 15 and 16 that are remote from the pivot 17. When the ends of the parts 15 and 16 have been extended through the apertures 18 and 19, sealing wire may be passed through the holes 20 and 21 or the holes 22 and 23 in said ends, the first two holes being desirably small and circular and the latter two in the shape of crosses or slots. The sealing wire may be provided in two pieces 24, 25 respectively individual to the locking parts 15 and 16 of the locking device. Sealing slugs 26 and 27 are shown as being applied to the wire pieces 24 and 25, in Fig. 7. Either seal may be broken to release the cover to which it pertains without disturbing the other cover, both seals being broken if both covers are to be removed. Fig. 9 shows the locking part 15 that pertains to the meter chamber cover, in unlocking position, so that this cover may be released. This figure also shows the locking part 16 that pertains to the terminal chamber in locking position, so that this cover is not then releasable. For ease of illustration the sealing wires are omitted in Fig. 9. Fig. 10 shows the reverse of the conditions that are illustrated by Fig. 9. In Fig. 8 the two locking parts 15 and 16 are in lapping relation, so that a single piece of sealing wire may be passed through the holes thereof. In this arrangement when the single seal is broken both covers are released or releasable.

In the embodiment of the invention illustrated the wing 13 has an angular base of arcuate curvature that conforms to the curvature of the ring 5, this wing base being rigidly united with this ring in any suitable way as by brazing. The inner ring 6 and the cover 3 may have interengaging tongue and notch formations 28 and 29 to prevent possible creepage.

Changes may be made without departing from the invention.

Having thus described my invention, I claim:

1. In an electricity motor meter, the combination of a base; a cup shaped glass cover whose rim engages said base and is laterally extended to form a flange; a metal band surrounding the cover flange and contiguous portion of the meter base, said band being formed of an outer and inner ring that are secured together, the inner ring lapping the outer flat face of the cup rim and the outer ring having an inwardly projecting rim, this rim and the inner ring together defining a groove in which the flange is snugly received; and separable interengaging formations provided upon said base and band, operable to hold the cover upon the base.

2. In an electricity motor meter, the combination of a base; a cup shaped glass cover whose rim engages said base and is laterally extended to form a flange; a metal band surrounding the cover flange and contiguous portion of the meter base, said band being formed of an outer and inner ring that are secured together, the inner ring lapping the outer flat face of the cup rim and the outer ring having an inwardly projecting rim, this rim and the inner ring together defining a groove in which the flange is snugly received; and separable interengaging bayonet projection and channel formations provided upon said base and band, operable to hold the cover upon the base.

3. The structure of claim 1 wherein the cover and said band have interengaging formations to prevent creepage of the band on the cover.

4. The structure of claim 2 wherein the cover and said band have interengaging formations to prevent creepage of the band on the cover.

ALBERT L. EMENS.